(12) United States Patent
Beda, III et al.

(10) Patent No.: US 9,292,319 B2
(45) Date of Patent: Mar. 22, 2016

(54) GLOBAL COMPUTING INTERFACE

(71) Applicant: Google Inc., Mountain View, CA (US)

(72) Inventors: Joseph S. Beda, III, Seattle, WA (US); Cristian Petrescu-Prahova, Seattle, WA (US); Vishesh Khemani, Seattle, WA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/842,456

(22) Filed: Mar. 15, 2013

(65) Prior Publication Data
US 2013/0263131 A1    Oct. 3, 2013

Related U.S. Application Data (60) Provisional application No. 61/616,978, filed on Mar. 28, 2012.

(51) Int. Cl.
*G06F 9/455* (2006.01)
*G06F 9/46* (2006.01)
*G06F 15/173* (2006.01)
(Continued)

(52) U.S. Cl.
CPC *G06F 9/455* (2013.01); *G06F 8/63* (2013.01); *G06F 9/45533* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4868* (2013.01); *G06F 9/4875* (2013.01); *G06F 9/50* (2013.01); *G06F 9/5005* (2013.01); *G06F 9/505* (2013.01);
(Continued)

(58) Field of Classification Search
None
See application file for complete search history.

(56) References Cited

U.S. PATENT DOCUMENTS 7,484,208 B1 * 1/2009 Nelson .............................. 718/1
8,146,082 B2 * 3/2012 Belay .................. G06F 9/45558
711/6

(Continued)

FOREIGN PATENT DOCUMENTS

| EP | 2049991 | 4/2009 |
| EP | 2075694 | 7/2009 |
| EP | 2048578 | 4/2013 |

OTHER PUBLICATIONS

International Preliminary Report on Patentability in International Application No. PCT/US2013/033855, mailed Oct. 9, 2014, 10 pages.

(Continued)

*Primary Examiner* — Charles Swift
(74) *Attorney, Agent, or Firm* — Fish & Richardson P.C.

(57) ABSTRACT

Methods, systems, and apparatus, including computer programs encoded on computer storage media, for implementing a global computing interface. One of the methods includes maintaining a global database of virtual machine configuration information, the database including information on cloud computing resources in each of a plurality of regions, wherein each region of the plurality of regions includes one or more datacenters. A virtual machine image is received in a first region. The global database is updated with configuration information about the received virtual machine image that is stored in the first region. A request is received to start one or more virtual machines from the virtual machine image in a second different region, and the virtual machine image is transmitted from the first region to the second region and one or more virtual machines are started from the virtual machine image in a datacenter of the second different region.

14 Claims, 4 Drawing Sheets

(51) Int. Cl.
*G06F 9/48* (2006.01)
*G06F 9/50* (2006.01)
*G06F 9/445* (2006.01)

(52) U.S. Cl.
CPC .......... *G06F 9/5011* (2013.01); *G06F 9/5022* (2013.01); *G06F 9/5027* (2013.01); *G06F 9/5055* (2013.01); *G06F 9/5072* (2013.01); *G06F 9/5083* (2013.01); *G06F 9/5088* (2013.01); *G06F 2009/45562* (2013.01); *G06F 2009/45575* (2013.01)

(56) References Cited

U.S. PATENT DOCUMENTS

| | | | |
|---|---|---|---|
| 8,364,968 B2 | 1/2013 | Corcoran et al. | |
| 8,402,441 B2 | 3/2013 | Budko et al. | |
| 2009/0276774 A1* | 11/2009 | Kinoshita | 718/1 |
| 2010/0017515 A1* | 1/2010 | Nishiguchi | G06F 9/5077 709/226 |
| 2010/0088699 A1* | 4/2010 | Sasaki | 718/1 |
| 2010/0100880 A1* | 4/2010 | Shigeta et al. | 718/1 |
| 2010/0100881 A1* | 4/2010 | Shigeta et al. | 718/1 |
| 2011/0004676 A1* | 1/2011 | Kawato | 709/221 |
| 2011/0029672 A1* | 2/2011 | Agneeswaran | 709/226 |
| 2011/0302580 A1* | 12/2011 | Iikura et al. | 718/1 |
| 2012/0017031 A1* | 1/2012 | Mashtizadeh | G06F 9/45558 711/6 |
| 2012/0054367 A1* | 3/2012 | Ramakrishnan et al. | 709/242 |
| 2012/0254364 A1 | 10/2012 | Vijayan | |
| 2012/0311574 A1* | 12/2012 | Song | 718/1 |
| 2013/0014103 A1* | 1/2013 | Reuther | G06F 3/0647 718/1 |

OTHER PUBLICATIONS

Dinda et al., "A Case for Grid Computing on Virtual Machines". Proceedings of the International Conference on Distributed Computing Systems, IEEE Computer Society, U.S., May 22, 2003, pp. 1-10.
International Search Report and Written Opinion from PCT Application Serial No. PCT/US2013/033855, mailed Jun. 28, 2013, 12 pp.

* cited by examiner

GLOBAL COMPUTING INTERFACE

CROSS-REFERENCE TO RELATED APPLICATIONS

This application claims the benefit under 35 U.S.C. §119 (e) of the filing date of U.S. Provisional Patent Application No. 61/616,978, filed on Mar. 28, 2012, entitled "Global Computing Interface," the entirety of which is herein incorporated by reference.

BACKGROUND

This specification relates to cloud computing.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

Multiple datacenters in distant regions around the globe can be coordinated through multiple cluster managers and a global database of virtual machine configuration information to manage resources of a virtual machine system. Thus, a user can upload a virtual machine image in a first region and can then start virtual machines from the virtual machine image in a second region. The virtual machine image can be automatically transferred to the second region without further interaction from the user.

In general, one innovative aspect of the subject matter described in this specification can be embodied in methods that include the actions of maintaining a global database of virtual machine configuration information, the database including information on cloud computing resources in each of a plurality of regions, wherein each region of the plurality of regions includes one or more datacenters; receiving and storing a virtual machine image in a first region; updating the global database with configuration information about the received virtual machine image that is stored in the first region; receiving a request to start one or more virtual machines from the virtual machine image in a second different region of the plurality of regions; and in response to the request, transmitting the virtual machine image from the first region to the second region and starting one or more virtual machines from the virtual machine image in a datacenter of the second different region without further user interaction. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Maintaining a global database of virtual machine configuration information comprises maintaining information on virtual machine images available in each of the plurality of regions. The actions include determining in the second region that the virtual machine image is stored in the first region and is not stored in the second region. The actions include replicating the global database in multiple regions of the plurality of regions. Receiving a request to start one or more virtual machines from the virtual machine image in a second different region of the plurality of regions comprises routing the request to a closest cluster manager. Starting one or more virtual machines from the virtual machine image in a datacenter of the second different region without further user interaction comprises routing a request to start one or more virtual machines from the virtual machine image to a cluster manager of the second different region. Routing a request to start one or more virtual machines from the virtual machine image to a cluster manager of the second different region comprises detecting a change to the global database; and in response to detecting the change to the global database, routing the request to a nearest cluster manager.

In general, another innovative aspect of the subject matter described in this specification can be embodied in a system that includes a global database of virtual machine image configuration information, including information on cloud computing resources in each of a plurality of regions, wherein each region of the plurality of regions includes one or more datacenters; and a separate cluster manager for each of the plurality of regions, wherein a cluster manager in a particular region, upon receiving a virtual machine image, updates the global database with configuration information about the virtual machine image, including information identifying the virtual machine image as being stored in the particular region, and wherein a first cluster manager server, upon receiving a request to start one or more virtual machines from a virtual machine image in a first region in which no virtual machines of the virtual machine image are stored, obtains information from the global database that the virtual machine image is stored in a second region, and initiates a request to start the one or more virtual machines in the first region in response to the request and without further user interaction. Other embodiments of this aspect include corresponding methods, computer systems, apparatus, and computer programs recorded on one or more computer storage devices, each configured to perform the actions of the system.

The foregoing and other embodiments can each optionally include one or more of the following features, alone or in combination. The global database is replicated in each region of the plurality of regions. Starting one or more virtual machines from the virtual machine image in a datacenter of the second different region without further user interaction comprises routing a request to start one or more virtual machines from the virtual machine image to a cluster manager of the second different region. Routing a request to start one or more virtual machines from the virtual machine image to a cluster manager of the second different region comprises detecting a change to the global database; and in response to detecting the change to the global database, routing the request to a nearest cluster manager.

Particular embodiments of the subject matter described in this specification can be implemented so as to realize one or more of the following advantages. Implementing a global virtual machine API makes managing cloud computing resources in multiple regions around the globe more convenient, makes virtual machines and other cloud computing resources more accessible in distant regions, makes resource assignment global and global migration of resources possible.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
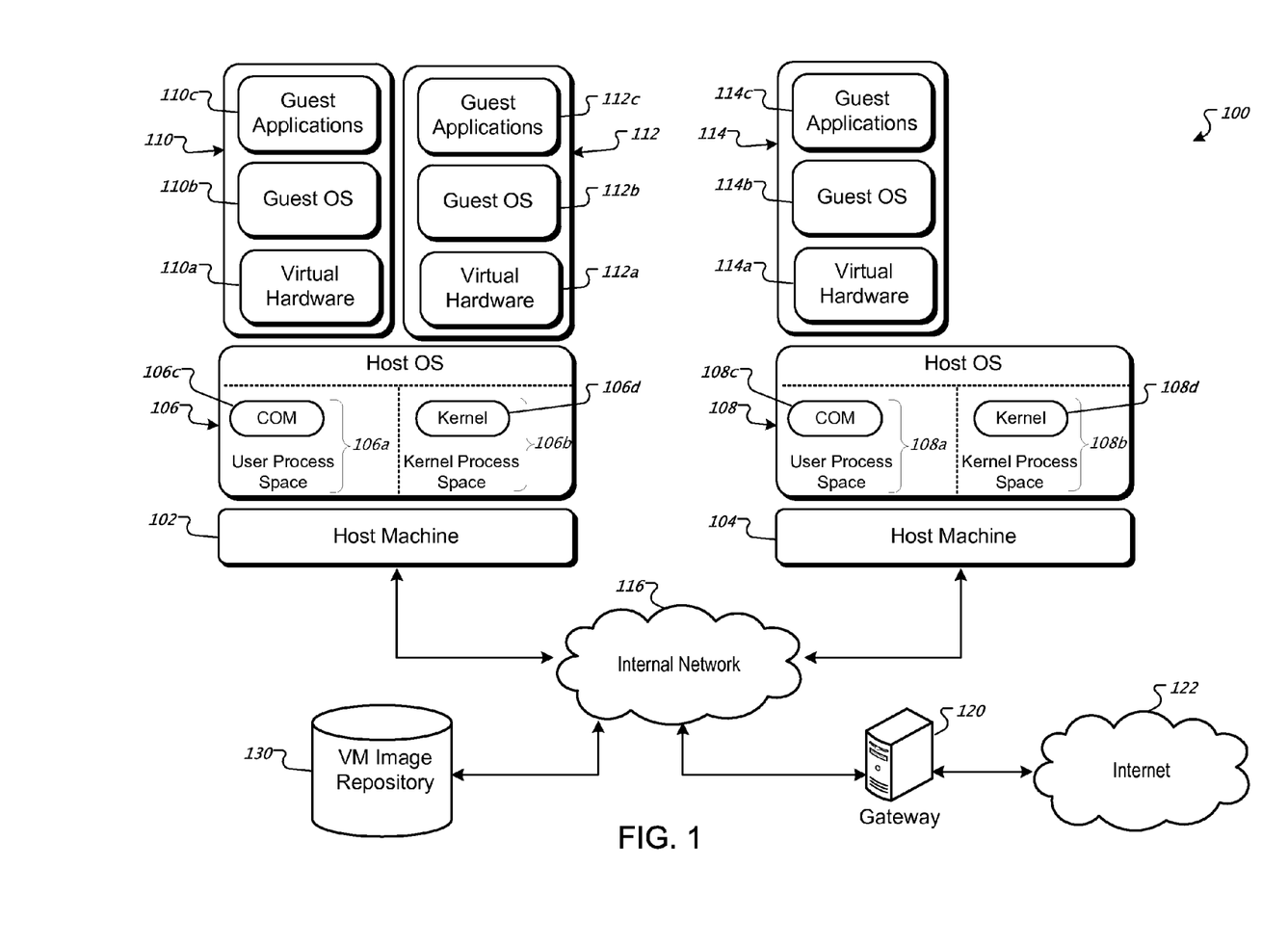
FIG. 1 is a schematic illustration of an example virtual machine system.

FIG. 1 is a schematic illustration of an example virtual machine system 100. The system 100 includes one or more host machines 102, 104. Generally speaking, a host machine is a computer such as rack mounted server or other computing device. The host machine computers can be in different physical locations and can have different capabilities and computer architectures. Host machines can communicate with each other through an internal data communications network 116. The internal network can include one or more wired, e.g., Ethernet, or wireless, e.g., WI-FI, networks, for example. In some implementations the internal network 116 is an intranet. Host machines can also communicate with devices on external networks, e.g., the Internet 122, through one or more gateways 120. Other types of external networks can also be used.

Each host machine executes a host operating system that virtualizes the underlying host machine hardware and manages concurrent execution of one or more virtual machines ("VMs"). For example, FIG. 1 illustrates a the host operating system 106 that is managing two VMs 110 and 112, while host operating system 108 is managing a single VM 114.

Each VM includes a simulated version of the underlying host machine hardware or hardware of a different computer architecture. The simulated version of the hardware is referred to as virtual hardware, illustrated as virtual hardware 110a, 112a, and 114a.

Software that is executed by the virtual hardware is referred to as guest software. In some implementations, guest software cannot determine if it is being executed by virtual hardware or by a physical host machine. If guest software executing in a VM, or the VM itself, is compromised, malfunctions, or aborts, other VMs executing on the host machine will not be affected.

A host machine's instruction processor or processors can include processor-level mechanisms to enable virtual hardware to execute software applications efficiently by allowing guest software instructions to be executed directly on the host machine's microprocessor without requiring code-rewriting, recompilation, or instruction emulation.

Each VM is allocated a set of virtual memory pages from the virtual memory of the underlying host operating system and is allocated virtual disk blocks from one or more virtual disk drives for use by the guest software executing on the VM. In some implementations, a given VM cannot access the virtual memory pages assigned to other VMs.

A virtual disk drive can be persisted across VM restarts. Virtual disk blocks are allocated on physical disk drives coupled to host machines or available remotely, e.g., over the internal network 116.

In addition to virtual memory and disk resources, VMs can be allocated network addresses through which their respective guest software can communicate with other processes reachable through the internal network 116 or the Internet 122. In some implementations, each VM is allocated one or more unique Internet Protocol (IP) version 4 or version 6 addresses and one or more User Datagram Protocol (UDP) port numbers. Other address schemes are possible. The VM IP addresses are visible on the internal network 116 and, in some implementations, are visible on the Internet 122. This can be done by advertising the addresses using a suitable routing protocol, for instance.

A VM's guest software can include a guest operating system 110b, 112b, and 114b, which is software that controls the execution of respective guest software applications 110c, 112c, and 114c within the VM and provides services to those applications. For example, a guest operating system could be a version of the UNIX operating system. Other operating systems can also be used as guest operating systems. Each VM running on a host machine can execute the same guest operating system or different guest operating systems. In some cases, a VM does not require a guest operating system in order to execute guest software applications. A guest operating system's access to resources such as networks and virtual disk storage is controlled by the underlying host operating system.

By way of illustration, and with reference to virtual machine 110, when the guest application 110c or the guest operating system 110b attempts to perform an input/output operation on a virtual disk, initiate network communication, or perform a privileged operation, the virtual hardware 110a is interrupted so that the host operating system 106 can perform the action on behalf of the virtual machine 110. The host operating system 106 can perform these actions with a process that executes in kernel process space 106b, user process space 106a, or both, of the host operating system 106.

The kernel process space 106b is virtual memory reserved for the host operating system 106's kernel 106d which can include kernel extensions and device drivers, for instance. The kernel process space has elevated privileges; that is, the kernel 106d can perform certain privileged operations that are processes running in the user process space 106a are not permitted to perform. Examples of privileged operations include accessing different address spaces, accessing special functional processor units in the host machine such as memory management units, and so on. The user process space 106a is a separate portion of virtual memory reserved for user mode processes. User mode processes cannot perform privileged operations directly.

In various implementations, a portion of VM network communication functionality is implemented in a communication process 106c. In some implementations, the communication process executes in the user process space of a host operating system. In other implementations, the communication process can execute in the kernel process space of the host operating system. In yet further implementations, some portion of the communication process executes in the user process space and another portion executes in the kernel process space.

In some implementations, the communication process can initialize VMs on a host machine by downloading a VM image from a VM image repository 130 over a communication network. A VM image can be a package of one or more files including, for example, device drivers, kernel binaries, file system specifications, in addition to a variety of other files. The VM image can be compressed and packaged. The communication process can uncompress and unpackage the one or more files of the VM image and initiate execution of a VM on the host machine with the VM image.

Figure 2:
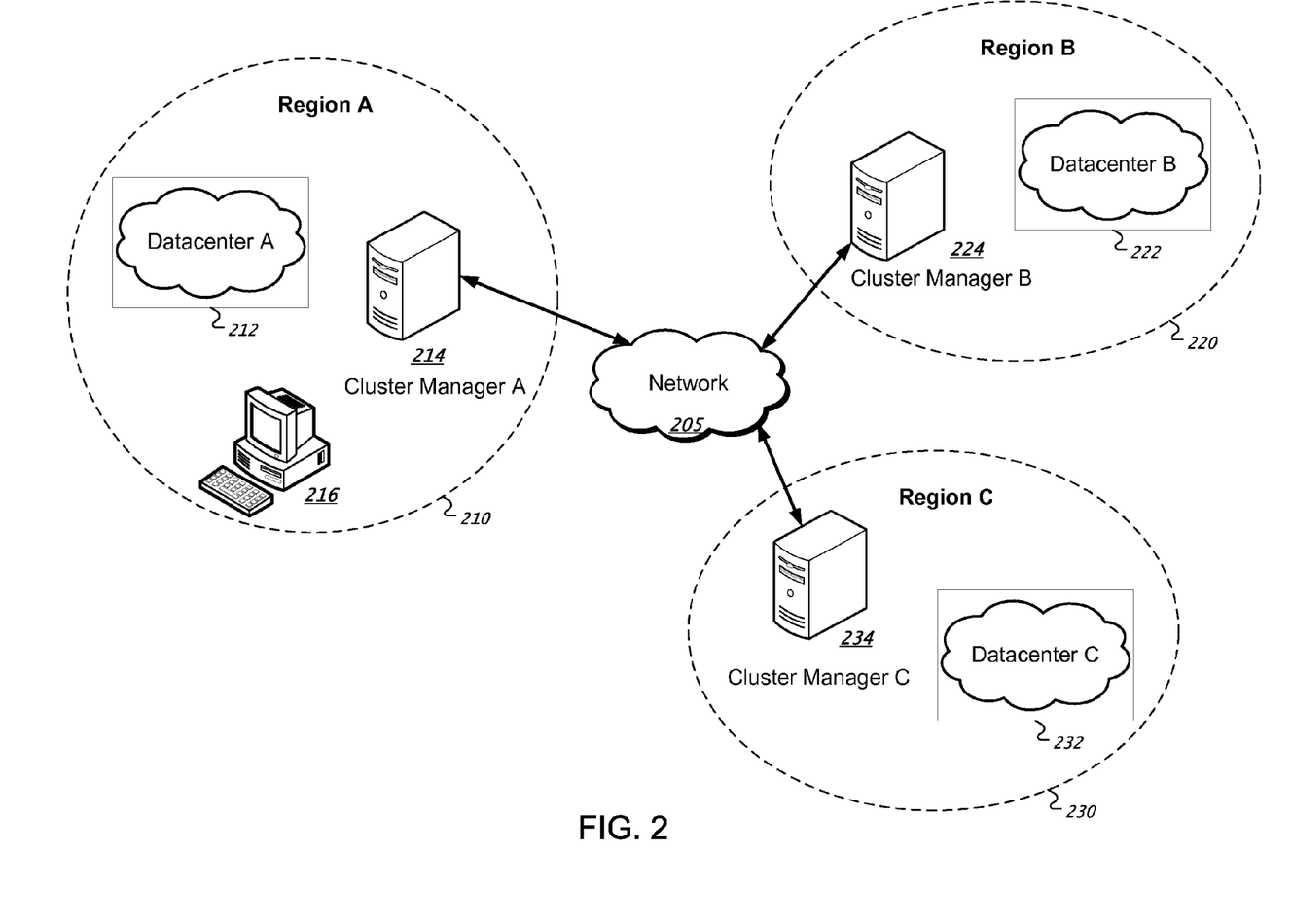
FIG. 2 is a diagram of multiple virtual machine regions.

FIG. 2 is a diagram of multiple virtual machine regions. Each virtual machine cluster can be implemented in one or more datacenters in one or more locations in the same region. For example, the virtual machine system 100 as shown in FIG. 1 can be implemented in a datacenter in Region A 210.

Each region has a replicated cluster manager 214, 224, 234 that operates on a globally replicated database of system resources, coordinates virtual machine operations in the region, and coordinates operations with cluster managers of other regions. Each cluster manager can be implemented as one or more computer programs or program modules installed on a respective computer system of one or more computers. The computer system can be dedicated to a cluster manager, or the cluster manager can share the computer system with software performing other functions.

The cluster managers 214, 224, 234 implement a global virtual machine application programming interface (API) for virtual machine administrators to manage and perform operations on virtual machines in clusters of any region. An API is an interface that provides interactivity between software modules. An API allows one software component to access particular services implemented by another software component. An API defines the language and parameters that API-calling software modules use when accessing the particular services that have been implemented.

The global virtual machine API implemented by the cluster managers provides the functionality for administrators to perform various operations for controlling virtual machines and other cloud resources in one or more regions. Virtual machine system resources can include virtual machine images, virtual networks, firewall rules, IP addresses, load balancers, disk snapshots, and virtual machine metadata. For example, a user of the API can start virtual machines in multiple regions with the same image and attached to the same virtual network. The user can then migrate the external IP used by the VM to another VM. The user can also use a virtual machine image stored in a first region to start a virtual machine from the virtual machine image in a different second region. API calls may include calls for starting a particular number of virtual machines, starting a particular number of virtual machines in one or more particular regions, specifying or uploading a particular virtual machine image, starting a virtual machine from a particular virtual machine image, migrating a particular virtual machine image from one region to another region, stopping virtual machines in one or more regions, specifying or uploading an update to an existing virtual machine image, in addition to calls for performing a variety of other commands.

In some implementations, the cluster managers operate on one, globally replicated database that maintains information about the allocation and availability of system resources. The database can, for example, keep track of the number, type, and status of virtual machines allocated to a particular user account. When virtual machine images are received or stored, or virtual machines are started or terminated in a particular region, the cluster manager for that region can update the database accordingly. Changes to the database can be replicated to other geographic regions for use by the other cluster managers in those regions.

Virtual machines can be started in a particular region as follows. In response to an administrator request, a user device 216 can communicate with cluster manager A 214 by using an API call that specifies a number of virtual machines to start in Region A 212. In response to the API call, cluster manager A 214 can start the specified number of virtual machines in cluster A 212. In addition, the user device 216 can communicate with cluster manager A 214 by using an API call that specifies a number of virtual machines to start in Region B 220, even though user device 216 and cluster manager A 214 are in Region A 210. In some implementations, the user does not specify a particular cluster manager, and the system instead routes a request from a user to the closest cluster manager.

In response to the API call, cluster manager A 214 can coordinate over network 205 with cluster manager B 224 in Region B 220 to start the specified number of virtual machines in Region B. Cluster manager B 224 can, for example, start the specified number of virtual machines in cluster B 222, or in some other cluster.

In some implementations, a cluster manager can respond to the request by writing changes to the globally replicated database that updates the configuration information about resources in the system. The system can then route the request to a cluster manager in the appropriate region to effectuate the requested changes. The system can for example include a global reconciler that detects changes to the database and routes requests to the appropriate cluster managers.

In some implementations, the regions are hundreds or thousands of miles apart, e.g., North America and Europe being distinct regions. Cluster managers can communicate with one another and with user devices over the Internet or over a private network, e.g., with HTTP requests and responses. In some implementations, the regions are interconnected with a private fiber network no matter the distance between the regions.

Administrators of virtual machines can use the global virtual machine API to start virtual machines that are geographically closer to users accessing a particular set of virtual machines. For example, users physically located in Region B may have a better experience interacting with virtual machines running in cluster B 222 rather than virtual machines running in cluster A 222. In some implementations, administrators can specify only a region for a set of virtual machines, and the global virtual machine API hides the implementation details of which of one or more clusters in the specified region will be running the virtual machines.

A request from a user device 216 to cluster manager A 214 can specify, through a call to the global virtual machine API, a particular region, in addition to a number of other potential parameters, e.g., a particular VM image and a particular number of virtual machines. Cluster manager A 214 can then to route the request to the appropriate cluster manager in the specified region, in this example cluster manager B 224 in Region B 220. Cluster manager B 224 can determine whether the VM image in the request is available in Region B. In this context, a virtual machine image being available in a region means that the VM image is either stored locally in a VM image repository in the region or is running on a host machine in that region. If the VM image is available only in Cluster A 211 in Region A 210, cluster manager B 224 can coordinate with cluster manager A 214 or a globally available storage system to transfer the appropriate VM image from storage in Cluster A 212 to Cluster B 222. Similarly, the user device 216 can use the global virtual machine API to specify multiple regions in a single request, including a request to start a number of virtual machines in Cluster C 232 in Region C 230, controlled by cluster manager C 234.

After user device 216 makes the API call to start a particular number of virtual machines in a particular region, a cluster manager in the region can maintain the virtual machines to ensure that the correct number of virtual machines continue running without further interaction from a user of user device 216. The cluster manager can, for example, automatically restart failed virtual machines and migrate virtual machines from failed host machines to running host machines. If user device 216 provides an updated virtual machine image, a cluster manager can stop running virtual machines from a previous virtual machine image, update the existing virtual machine image, and restart the appropriate number of virtual machines from the updated virtual machine image. Thus, the cluster managers in each region provide a global virtual machine API for a user in any region to start a VM image defined in any region in a cluster located in any region.

Figure 3:
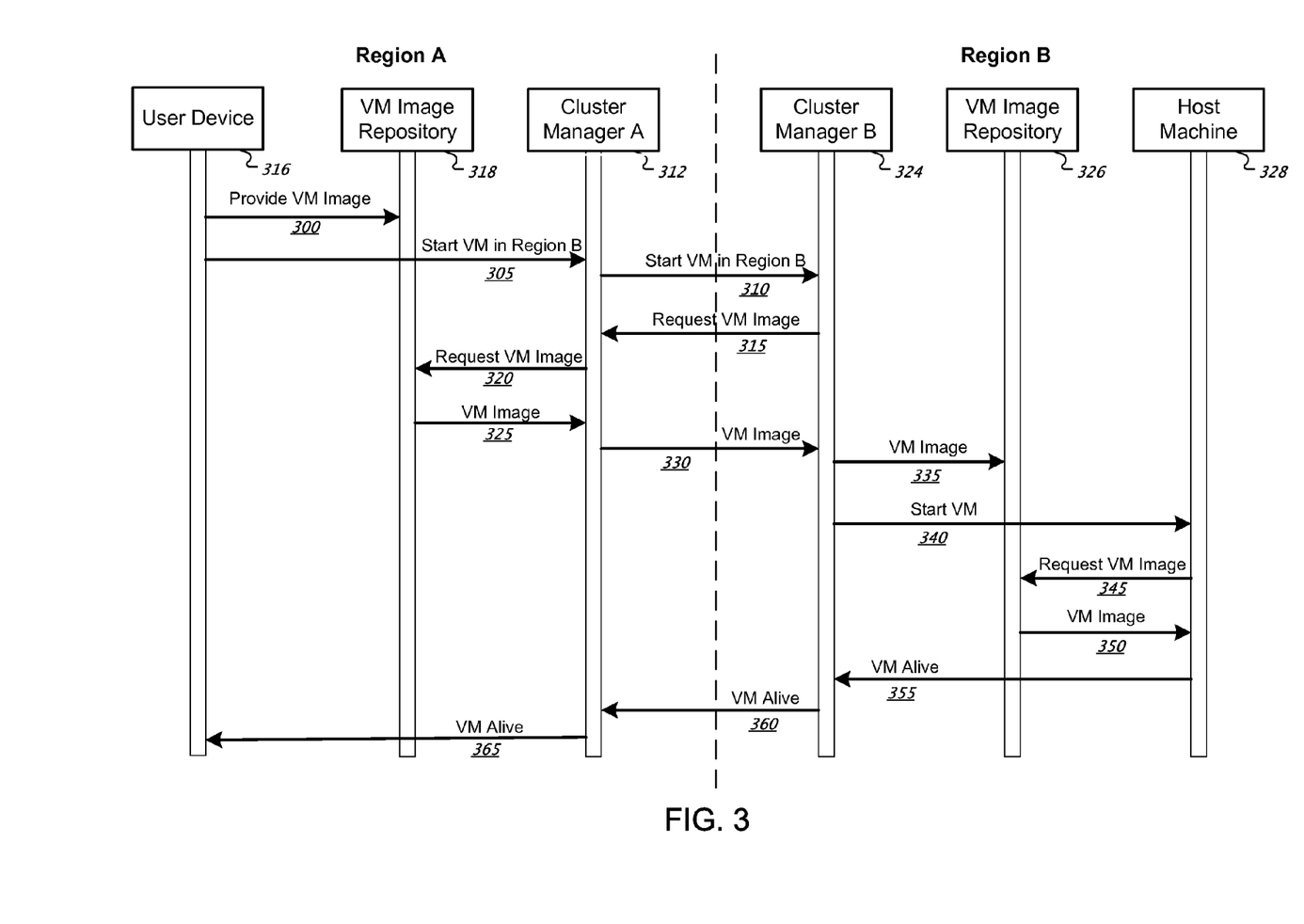
FIG. 3 is a sequence diagram of an example process performed in response to an API call to start a virtual machine in a region.

FIG. 3 is a sequence diagram of an example process performed in response to an API call to start a virtual machine in a region. In the example of FIG. 3, a user device 316 in Region A makes an API call 305 to start a virtual machine in a different region, Region B. Cluster manager A 312 in Region A and cluster manager B 324 in Region B coordinate to find the appropriate virtual machine image and start the virtual machine in Region B.

The user device 316 provides a VM image in Region A (300). The VM image can be stored in a VM image repository 318 that is local to Region A. After providing the VM image to the VM image repository 318, the cluster manager 312 of Region A can update a globally replicated database of VM configuration information to indicate that the provided VM image is available in Region A.

The user device 316 in Region A makes an API call to cluster manager A 312 in Region A to start a virtual machine in Region B (305). In some implementations, the user device can specify at least a region, a virtual machine image, and a number of virtual machines in the API call. For example, a call may be given by:

start_virtual_machine(region=Region_B, vm_image=VMImageID, number=1000), specifies that 1000 virtual machines should be started in Region B from virtual machine image "VMImageID". In some implementations, the API call can be made through one or more HTTP requests, e.g., http://www.example.com/cloud?&region=RegionB&vm_image=13614&num=1000.

Cluster manager A 312 in Region A receives the API call 305 and makes a request to start the VM image in region B (310). Based on the region specified, cluster manager A 312 makes a request to cluster manager B 324 in Region B to start the specified number of virtual machines from the specified virtual machine image (310). In some implementations, if no region is specified, a cluster manager receiving the request will start the specified number of virtual machines in the region in which the cluster manager is located.

The request 310 to start a VM in Region B can also be initiated by an entity in the system other than cluster manager A 312. For example, a reconciler can monitor the globally replicated database of VM configuration information and can detect that cluster manager A has written to the database in order to effectuate starting a VM in Region B. In response, the reconciler can coordinate with cluster manager B 324 by making the request 310 to start the VM in Region b.

Cluster manager B 324 in Region B receives the request 310. Cluster manager B 324 can consult the global database to determine that the specified VM image is available in Region A but is not available in Region B. Therefore, if the virtual machine image specified in the API call 305 does not exist in Region B, cluster manager B 324 can request the virtual machine image from a cluster manager of a region in which the virtual machine image is available. In the present example, the virtual machine image can be found in Region A so the request is made to cluster manager A 312 (315). In some implementations, the user device can upload a virtual machine image specification directly as part of the API call.

Cluster manager A 312 receives the request for the virtual machine image (315) and requests the virtual machine image from a local VM image repository 318 (320). The VM image repository 318 responds with the requested virtual machine image (325), and the cluster manager A 312 forwards the virtual machine image to cluster manager B 324 (330). In some implementations, cluster manager A 312 can prefetch the virtual machine image specification and include the virtual machine image specification with the initial request (310) to start the virtual machines. Cluster manager B 324 receives the virtual machine image (330) and stores the received virtual machine image in a local VM image repository 326 (335).

Cluster manager B 324 sends a request or multiple requests to start the specified number of virtual machines in a host machine 328 (340) or multiple host machines. Cluster manager B 324 can determine a number of virtual machines to start on each of multiple host machines.

The host machine 328 requests the virtual machine image from the local VM image repository 326 (345), and the local VM image repository 326 provides the requested VM image in response to the request (350).

After starting the virtual machine, the host machine 328 informs cluster manager B that the virtual machine has started successfully, e.g., by sending a "VM alive" message to cluster manager B 324 (355). Cluster manager B 324 can forward the "VM alive" message to cluster manager A 312 in Region A (360), and cluster manager A 312 in Region A can forward the "VM alive" message back to the user device 316 that made the initial API call.

Figure 4:
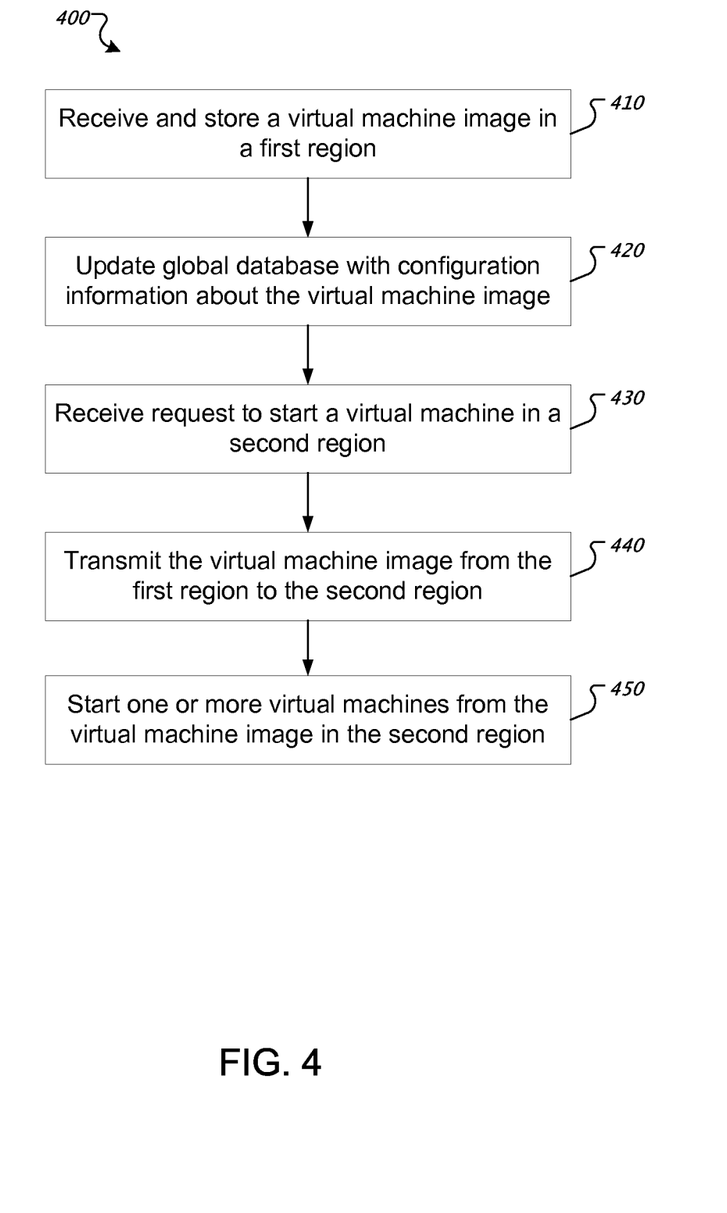
FIG. 4 is a flow chart of an example process 400 for starting a virtual machine in a particular region.

FIG. 4 is a flow chart of an example process 400 for starting a virtual machine in a particular region. The process 400 will be described as a being performed by a computer system of one or more computers, for example, the system of cluster managers in multiple regions shown in FIG. 2.

The system receives and stores a virtual machine image in a first region (410). The system updates a global database with configuration information about the virtual machine image (420). The system can maintain a global database of virtual machine configuration information for identifying regions where virtual machine image are available and in which regions particular virtual machines are running. The system can replicate the database in each of multiple regions.

The system receives a request to start a virtual machine in a second region (430). By consulting the global database of virtual machine information, the system can determine whether or not the requested virtual machine image is available in the second region.

The system transmits the virtual machine image from the first region to the second region (440). The system can first determine whether the virtual machine image is not available in the second region. If the virtual machine image is not available in the second region, the system can transfer the virtual machine image from the first region to the second region.

The system starts one or more virtual machines from the virtual machine image in the second region (450). After transferring the virtual machine image to the second region, the system can use the transferred virtual machine image to start virtual machines on host machines that are physically located in the second region. After the request to start the virtual machine in a second region (430), the system can coordinate with systems in multiple regions to carry out the request without further user interaction.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

maintaining a global database of virtual machine configuration information, the database including information on which virtual machine images are stored in each of a plurality of datacenters, each datacenter being located in one region of a plurality of regions, wherein each datacenter has a cluster manager located in the region of the datacenter that manages virtual machine images in the datacenter;

receiving and storing, by a first cluster manager for a first datacenter in a first region, a virtual machine image in a first datacenter in the first region;

receiving, by the first cluster manager from a user, a request to start one or more virtual machines from the virtual machine image in a second datacenter in which the virtual machine image is not stored, the second datacenter being in a different second region of the plurality of regions;

in response to receiving the request to start one or more virtual machines, providing, by the first cluster manager to a different second cluster manager for the second datacenter in the second region, a request to start, in the second datacenter, one or more virtual machines from the virtual machine image;

determining, by the second cluster manager, that the virtual machine image is stored in the first datacenter and that the virtual machine image is not stored in the second datacenter;

in response to the determining, providing, by the second cluster manager to the first cluster manager, a request to transmit the virtual machine image from the first datacenter to the second datacenter; and in response to receiving the request to transmit the virtual machine image, transmitting, by the first cluster manager, the virtual machine image from the first datacenter in the first region to the different second cluster manager for the second datacenter in the second region, storing, by the second cluster manager, the virtual machine image in the second datacenter in the second region, and starting one or more virtual machines from the virtual machine image in the second datacenter of the second region without receiving further user interaction from the user.

2. The method of claim 1, further comprising updating, by the first cluster manager for the first datacenter, the global database with an indication that the virtual machine image is stored in the second datacenter in the second region.

3. The method of claim 2, further comprising replicating, in the global database, the indication that the virtual machine image is stored in the second datacenter in the second region.

4. The method of claim 1, further comprising:

in response to receiving, from the user, the request to start one or more virtual machines from the virtual machine image, determining that the first cluster manager is a cluster manager that is closest to a location of the user; and routing the request to the first cluster manager.

5. The method of claim 1, further comprising:

in response to the request, updating the global database of virtual machine configuration information to include an indication of the request from the user to start one or more virtual machines in the second datacenter; and routing the request to the second cluster manager for the second datacenter in the second region.

6. A system comprising:

one or more computers and one or more storage devices storing instructions that are operable, when executed by the one or more computers, to cause the one or more computers to perform operations comprising:

maintaining a global database of virtual machine configuration information, the database including information on which virtual machine images are stored in each of a plurality of datacenters, each datacenter being located in one region of a plurality of regions, wherein each datacenter has a cluster manager located in the region of the datacenter that manages virtual machines in the datacenter;

receiving and storing, by a first cluster manager for a first datacenter in a first region, a virtual machine image in a first datacenter in the first region;

receiving, by the first cluster manager from a user, a request to start one or more virtual machines from the virtual machine image in a second datacenter in which the virtual machine image is not stored, the second datacenter being in a different second region of the plurality of regions;

in response to receiving the request to start one or more virtual machines, providing, by the first cluster manager to a different second cluster manager for the second datacenter in the second region, a request to start, in the second datacenter, one or more virtual machines from the virtual machine image;

determining, by the second cluster manger, that the virtual machine image is stored in the first datacenter and that the virtual machine image is not store din the second datacenter;

in response to the determining, providing, by the second cluster manager to the first cluster manager, a request to transmit the virtual machine image from the first datacenter to the second datacenter; and in response to receiving the request to transmit the virtual machine image, transmitting, by the first cluster manager, the virtual machine image from the first datacenter in the first region to a different second cluster manager for the second datacenter in the second region, storing, by the second cluster manager, the virtual machine image in the second datacenter in the second region, and starting one or more virtual machines from the virtual machine image in the second datacenter of the second region without receiving further user interaction from the user.

7. The system of claim 6, wherein the operations further comprise updating, by the first cluster manager for the first datacenter, the global database with an indication that the virtual machine image is stored in the second datacenter in the second region.

8. The system of claim 7, wherein the operations further comprise replicating, in the global database, the indication that the virtual machine image is stored in the second datacenter in the second region.

9. The system of claim 6, wherein the operations further comprise:

in response to receiving, from the user, the request to start one or more virtual machines from the virtual machine image, determining that the first cluster manager is a cluster manager that is closest to a location of the user; and routing the request to the first cluster manager.

10. The system of claim 6, wherein the operations further comprise:

in response to the request, updating the global database of virtual machine configuration information to include an indication of the request from the user to start one or more virtual machines in the second datacenter; and routing the request to the second cluster manager for the second datacenter in the second region.

11. A system comprising:

a plurality of datacenters, each datacenter comprising a plurality of computers, each datacenter being located in one region of a plurality of regions;

a global database of virtual machine image configuration information, including information on which virtual machine images are stored in each of the plurality of datacenters; and a plurality of cluster managers, each cluster manager of the plurality of cluster managers being installed in a separate datacenter of the plurality of datacenters, wherein each cluster manager for each particular datacenter in each particular region is configured, upon receiving a virtual machine image, to store the virtual machine image in the particular datacenter and to update the global database with an indication that the virtual machine image is stored in the particular datacenter in the particular region, and wherein each cluster manager for each particular datacenter in each particular region is configured to receive a request, from a different cluster manager of a different datacenter in a different region, to start one or more virtual machines from a virtual machine image stored in the different datacenter in the different region, determine, from the virtual machine image configuration information, that the virtual machine image is not stored in the particular datacenter, determine, from the virtual machine image configuration information, that the virtual machine image is stored in the different datacenter in the different region, and in response, provide a request to the different cluster manager for the different datacenter in the different region to transmit the virtual machine image from the different datacenter to the particular datacenter and start, in the particular datacenter, the one or more virtual machines from the received virtual machine image.

12. The system of claim 11, wherein:

the global database is replicated in each datacenter of the plurality of datacenters.

13. The system of claim 11, wherein each cluster manager for each particular datacenter is configured to receive a request from a user to start one or more virtual machines in a different datacenter, and in response, route the request to a different cluster manager for the different datacenter.

14. The system of claim 13, wherein each cluster manager for each particular datacenter is configured to update the virtual machine image configuration information to include an indication of the request from the user to start one or more virtual machines in the different datacenter.

* * * * *